June 8, 1926.
E. R. CLARK
EXTRACTION OF CELLULOSE
Filed Feb. 12, 1925
1,587,631
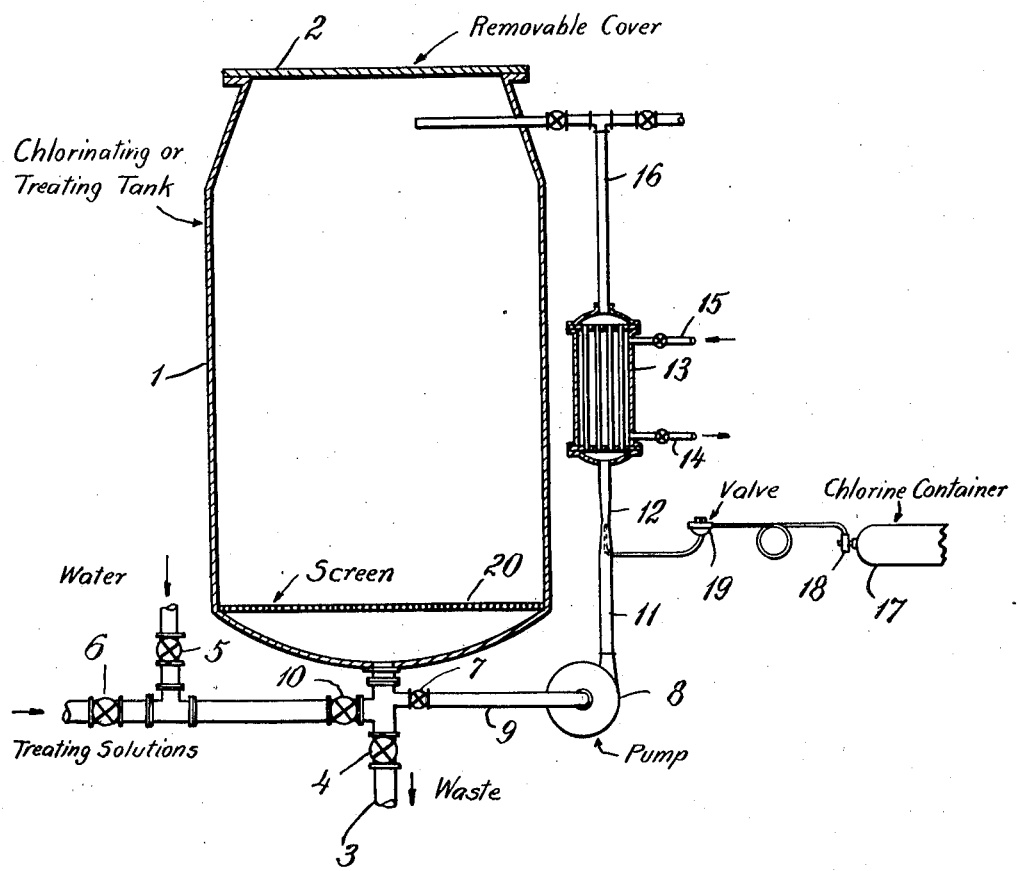
INVENTOR
*Edgar R. Clark*
BY
ATTORNEYS Patented June 8, 1926.

1,587,631

UNITED STATES PATENT OFFICE.

EDGAR RAYMOND CLARK, OF PITTSBURGH, PENNSYLVANIA, ASSIGNOR TO MILTON S. ERLANGER, OF NEW YORK, N. Y.

EXTRACTION OF CELLULOSE.

Application filed February 12, 1925. Serial No. 8,676.

This invention relates to the manufacture of cellulose, and particularly cellulose fibre products, from cellulose-containing raw materials of vegetable origin, such as wood, cereal straws, and particularly flax straw. The cellulose products may be in the form of pulp, e. g., where wood is the material treated, or textile fibres, e. g., where flax straw is treated.

It has heretofore been proposed to treat vegetable materials by a succession of treatments including alkaline digestion, exposure to chlorine, and a second alkaline digestion, to remove most of the non-cellulosic constituents and leave the cellulose. In such methods, the chlorination treatment presents peculiar difficulties. During the chlorination, a very considerable amount of heat is developed and a large amount of hydrochloric acid is formed, with the result that the material is subjected to the action of a hot and rather strong solution of hydrochloric acid, and the cellulose is more or less disintegrated. Attempts have been made to overcome such difficulties in processes in which the chlorine was used in gaseous form, but such utilization of chlorine gas in the manner proposed tends to give a partially disintegrated cellulose or else requires an impracticable length of time. Attempts have been made to overcome these difficulties by the use of chlorine solutions, which are kept chilled and caused to flow counter-current to a stream of well-pulped wood or cereal straw. Such chilling of the solution involves an added expense, and such processes present practical difficulties in adjusting the two currents so that the exact amount of chlorine needed is used without using an excess, which would be wasteful and damaging to the quality of the product, and also without using too little chlorine, which would lead to imperfect subsequent purification. Such methods, moreover, are not applicable to materials such as flax stalks, unless subjected to a prior cooking operation which reduces the fibre to such small dimensions that the product may be pulped.

The present invention provides an improved method of treating cellulose-bearing materials in which the difficulties and objections of prior methods, and particularly the chlorination treatment of prior methods, are largely overcome or minimized. The process of the present invention, moreover, as distinguished from such prior proposals, is well adapted for the production of long strong fibres from flax stalks or straw, such that the fibres are available for textile purposes and for the manufacture of finer types of paper. The present invention is moreover well adapted for the production of substantially pure forms of cellulose for chemical manufacturing and other purposes.

According to the present invention, the cellulose-bearing material is subjected first to a preliminary alkali treatment which is suitably regulated and controlled to give a product which can advantageously be subjected to a chlorination treatment. The resulting alkali-treated product is then subjected to an improved chlorination treatment to give a product from which, by subsequent alkali treatment, the non-cellulose constituents can be substantially completely removed, leaving a cellulose product of high purity. The invention includes improvements in the preliminary alkali treatment, in the chlorination treatment, and in the combination of these treatments, as well as improvements in the process as a whole, including the final alkali treatment.

The invention is of more or less general application to the treatment of cellulose-containing materials, such as wood, cereal straws, etc. The invention is particularly advantageous, however, for the treatment of flax stalks or straw, giving a resulting flax product well adapted for use for textile purposes.

The method of treatment, and the apparatus used, will vary somewhat with the different cellulose-containing materials. In the case of wood, for example, the wood can be reduced to the form of chips and treated first with the alkali solution in digesters similar to those used in the manufacture of pulp from wood; and the preliminary treatment can be carried to a greater or less extent. The wood chips can then be washed and treated with a solution containing chlorine, with suitable acid-resisting apparatus; and finally subjected to the final alkali treatment.

In carrying out the preliminary alkali treatment, the cellulose-bearing material is digested with a dilute alkali liquor under moderate pressure and for only a short period of time, this operation differing from the cooking of wood by the soda process for the manufacture of pulp in that only a low pressure and a short time of cooking is used. For example, the cellulose-bearing material can be digested with a solution of sodium hydroxide containing one per cent sodium hydroxide on the weight of the liquor, and using only a moderate pressure of about 10 to 15 pounds, and digesting the material for only a short time. During such digestion, a vigorous circulation is desirable, since such circulation promotes rapid action of the liquor and gives a more uniform product.

The method of heating and circulating the liquor can be varied. The heating may be effected, for example, by direct steam, introduced into the tank or digester, or by the use of internal circulating vomit pipes, or by the use of external circulating vomit pipes operated by a steam injector which serves to promote circulation and to heat the circulating liquor. The heating can also be effected by indirect means using a heat interchanger through which the liquor is circulated, for example, by means of a pump through an outside circulating line in which the heat interchanger is interposed. This enables positive circulation to be obtained under all conditions and avoids dilution of the liquor.

When flax straw is subjected to a short cooking treatment at low pressures, with a cooking liquor such as that above referred to, the flax is converted into a product such that it may be effectively chlorinated by the subsequent chlorination treatment.

In carrying out the chlorination process of the present invention, the chlorine is used in an entirely sealed apparatus and is completely discharged before opening the same, thereby avoiding any objectionable discharge of chlorine when the apparatus is opened. The cellulose-bearing material is also kept continuously covered with so large a volume of water that the concentration of hydrochloric acid is very low, even near the end of the treatment, and the heat of reaction is continuously absorbed so that objectionable heating of the acid liquor is avoided.

In carrying out the present process, the fibrous material is placed in a vessel of suitable acid-resistant construction provided with a tightly fitted cover and with an external circulating system having a pump and a gas injecting device for the introduction of chlorine. The pump may be of the centrifugal type and may be made of suitable acid-resistant material. The injector for the chlorine may be of any suitable construction which will permit the gas to be introduced and to be absorbed by the water. Since chlorine is only very slightly soluble in water, it is necessary to add it continuously to the water in order to bring adequate amounts of it into contact with the fibrous material. By circulating the solution of chlorine in water through the fibrous material, it will be evident that a very thorough and uniform treatment of the material is made possible. Moreover, by circulating the solution of chlorine in water through the fibrous material, this material is not itself subjected to stirring or to mechanical disintegration and entanglement. The process is thus distinguished from processes in which the material must be reduced to a pulp by a pulping operation prior to the chlorination and from processes in which an objectionable mechanical circulation is effected during the chlorination.

By providing for circulation of the liquor outside the apparatus, it can be cooled during such circulation and the heat of reaction neutralized at the same time that further amounts of chlorine are being continuously added to dissolve in the circulating liquor, so that the solution of chlorine in water which is being continuously circulated through the fibrous material is kept in a sufficiently cool condition to avoid overheating and resulting disintegration, while by the continuous addition of chlorine to the circulating water it is possible to bring about effective chlorination in a gradual and progressive manner, and with the avoidance of objectionable over-chlorination or disintegration.

During the treatment with the chlorine, samples can be withdrawn from time to time and the progress of the reaction determined by appropriate test of the samples with hot alkaline solution. For any given material, the amount of chlorine required will be practically the same in successive operations where the same amounts of material are treated, so that, by experimentally determining the amount of chlorine required for the amount of material being treated, the proper amount of chlorine can be added without the necessity of progressive testing, or with testing only when the chlorination nears completion. By avoiding prolongation of the chlorine treatment, and with cooling of the circulating liquor to offset the heat of reaction and prevent objectionable heating, it is possible to produce a chlorinated product substantially free from objectionable over-chlorination.

When the chlorination treatment is completed, the solution can be withdrawn and any chlorine gas also withdrawn from the apparatus before it is opened to remove the treated material. The apparatus can thus be kept tightly sealed until the chlorine has been removed, thus avoiding the corrosive and poisonous action of chlorine when the apparatus is opened.

After the chlorination treatment, the material can then be subjected to a further alkaline treatment to remove the constituents rendered alkali-soluble by the chlorine treatment. This subsequent alkali treatment can be carried out with dilute alkaline solutions at an elevated temperature.

An apparatus suitable for carrying out the chlorination treatment of the present invention is illustrated in a somewhat conventional and diagrammatic way in the accompanying drawing and the invention will be further described in connection therewith, it being intended and understood that this further description and illustration are for the purpose of exemplification and that the invention is not limited thereto.

The apparatus illustrated includes a receptacle or tank with removable top and with external circulating piping.

The tank 1, is made of suitable acid-resistant material capable of withstanding the action of the aqueous solution of chlorine. This tank has a removable top 2, which may be suitably secured in place during the chlorination. The tank also has a perforated false bottom 20, adapted to retain the cellulose-containing material, but to permit of the ready discharge of the liquor used for carrying out the process. At the bottom of the tank is provided an outlet pipe 3, having valve 4 therein, by means of which the spent liquors may be discharged at the end of the operation. Laterally connecting piping having valves 5, 6 and 10 therein, is arranged for the supply of water or chemical solutions to the tank. Another lateral pipe 9, having valve 7 therein, leads to the pump 8, from which the liquor is forced upwardly through the circulating line to the top of the tank. The external circulating pipe 11 is shown as having a restricted portion with a Venturi inlet 12, by means of which chlorine from the tank 17 is introduced through the valve 18 and reducing valve 19. A cooler 13 is provided by means of which cold water or other cooling medium may be used for absorbing heat of reaction during the circulation of the liquor. The cooling medium enters through valved connection 15 and leaves through valved connection 14, and circulates around the tubes through which the solution of chlorine and water passes. The solution, after passing through the cooler, is returned by the pipe 16 to the top of the tank, where it enters the tank above the material therein and may be distributed uniformly from the top of the material by suitable distributing means (not shown).

For handling batches of one ton of fibrous material, such as flax straw, the chlorinating tank 1 should have a capacity of approximately 3000 gallons and the pump 8 should circulate about 75 gallons of liquor per minute.

In operation, the tank 1 is filled with a charge of cellulose-containing material, such as flax straw, which has been prepared by suitable operations, particularly a prior digestion with an alkaline solution such as hereinbefore described. The lid 2 is securely fastened in place with gaskets to prevent chlorine leakage and the tank is nearly filled with cold water through valves 5 and 10. These valves are then closed, valve 7 opened, and the pump 8 started, the liquid contents of the tank being circulated through the external system for a few minutes to insure uniform wetting of the charge. The chlorine tank, for which any suitable source of wet or dry chlorine may be substituted, is then connected by opening the valve 18, and chlorine is passed into the expansion valve 19, whence it is drawn by suction of the inlet 12 into contact with the water circulating through the pipe 11. This operation is continued until the treatment with chlorine has been completed.

The amount of chlorine to be used can be determined by prior testing of a small sample by laboratory methods, or by testing a sample of the product after chlorination has progressed to a greater or less extent, to note the solubility of the non-cellulosic constituents in hot alkaline solutions. Where the proper amount of chlorine has been predetermined, the weight used can be determined by the use of meters or by simply weighing the tank 17 and noting when the proper weight of chlorine has escaped therefrom. Where the amount of chlorine to be used has not been predetermined, samples may be withdrawn and tested to determine when the chlorinating treatment has progressed to the desired extent. At the end of the operation, the valve 18 is closed, then the valve 7 is closed and the pump stopped. The liquor remaining in the tank may be used for first charging an adjacent tank of similar type, but ordinarily contains little of value except hydrochloric acid in low concentration, and may be withdrawn through valve 4 and run to waste. Several washings may be employed with advantage before the removable top 2 is removed. These washings can be effected in a simple manner by introducing water through the valve 5 and by effecting circulation of the water through the charge by means of the circulating pump. In this way the apparatus can be freed from chlorine and the material itself can be freed from chlorine before the apparatus is opened.

After the operation is completed, the fibrous material can be removed from the tank and subjected to hot alkaline solutions in suitable apparatus such as that employed for the boiling out of unspun cotton.

The invention will be further illustrated by the following specific example of its application to the treatment of flax straw:

One ton of the straw resulting from seed-flax culture is boiled for about 3 to 4 hours with a solution containing about 1% of the weight of fibre of caustic soda. The boiling is carried on with due regard to the possibility of tendering cellulose by exposure to air while wet with hot caustic soda solution, and is advantageously effected in a closed system with circulation of the solution through the material. High pressure is unnecessary and in fact undesirable, a mild pressure of around 10 to 15 pounds being suitable. The fibre is then washed free from alkali and transferred to the chlorinating vessel, which may be a tank such as that above described and illustrated in the drawing, and may be of suitable acid-resistant material. The fibre may be covered in the chlorinating vessel with water at ordinary temperature, say from 45 to 75° F., and, after a preliminary circulation of liquor to insure even wetting, the chlorine may be admitted while the circulation is continued. The amount of chlorine to be added can be determined by laboratory test of a sample of the material. Practical tests have shown that this amount of flax straw requires about 150 to 175 pounds of chlorine, where the preliminary cooking has been light to conserve fibre length. It has been found that vessels of this capacity work without undue heating with a chlorine consumption of about 30 to 35 pounds per hour. When the necessary amount of chlorine has been added, which can be told either by a prior laboratory test or by testing a sample to note the solubility of the non-cellulose material in hot caustic soda solution, the chlorine stream is shut off and the material washed with water using the circulating system. The material can then be subjected to the final treatment with hot alkaline solution to remove from the chlorinated material the alkali-soluble constituents and to give the cellulose fibres in a substantially pure form.

The treatment of the flax straw in the manner described results in the production of a substantially pure fibrous product containing long fibres and well adapted for use for textile purposes, or where long, strong fibres are desired. The flax straw is treated without disintegration to a pulp and without objectionable mechanical handling.

Instead of treating flax straw in the manner described, other cellulose-bearing materials can be similarly treated. Where the materials, like wood, have shorter fibres, the material may, during its treatment, be reduced to the form of a pulp, but the present process enables the pulp to be produced without objectionable mechanical action upon the fibres.

The chlorinating treatment of the present invention is of more or less general application to the treatment of fibrous materials which have been subjected to a preliminary alkali treatment. It is particularly advantageous, however, when applied to fibres which have been treated with a mild alkali solution and under mild conditions such as those hereinbefore described. The mild preliminary alkali treatment, moreover, is advantageous for use with other chlorination treatments, although it is particularly advantageous for use in connection with the chlorination treatment of the present invention.

It will thus be seen that the present invention provides an improved chlorination treatment in which the material is maintained in a relatively quiescent condition during the treatment with circulation of an aqueous solution containing chlorine through the material and with continual addition of chlorine to the circulating liquor. It will also be seen that the chlorination is effected without objectionable overheating of the solution and disintegration of the fibrous product. It will also be seen that the present invention provides a complete process, including the preliminary alkali treatment, the new chlorination treatment, and the subsequent alkali treatment, whereby fibrous materials of various kinds can be converted into substantially pure cellulose fibres without objectionable mechanical handling or disintegration of the fibres, and also without objectionable chemical disintegration of the fibres.

I claim:—

1. An improved process for the manufacture of cellulose which comprises circulating water through a body of cellulose-containing material, the circulation being maintained in a closed cycle by means external to the said body, and supplying chlorine to the circulating water as the operation proceeds.

2. An improved process for the manufacture of cellulose which comprises circulating water through a body of cellulose-containing material, the circulation being maintained in a closed cycle by means external to the said body, cooling the circulating water and supplying chlorine to the circulating water as the operation proceeds.

3. An improved process for the manufacture of cellulose which comprises circulating water through a body of cellulose-containing material, the circulation being maintained in a closed cycle by means external to the said body, and supplying chlorine to the circulating water as the operation proceeds at a point in the cycle external to the said body.

4. An improved process for the manufacture of cellulose which comprises circulating water through a body of cellulose-containing material, the circulation being maintained in a closed cycle by means external to the said body, maintaining the temperature of the circulating water between about 45° and 75° F., and supplying chlorine to the circulating water as the operation proceeds.

5. An improved process for the manufacture of cellulose which comprises subjecting cellulose-containing material to treatment with an alkaline solution, and thereafter circulating water through a body of the treated material, the circulation being maintained in a closed cycle by means external to the said body, and supplying chlorine to the circulating water as the operation proceeds.

6. An improved process for the manufacture of cellulose which comprises digesting cellulose-containing material with a dilute alkaline solution at an elevated temperature, and thereafter circulating water maintained at a relatively low temperature through a body of the digested material and supplying chlorine to the circulating water as the operation proceeds.

7. An improved process for the manufacture of cellulose which comprises subjecting cellulose-containing material to treatment with an alkaline solution, and thereafter subjecting a body of the treated material to treatment with a volume of water sufficient to cover it while maintaining circulation of the water through the said body by means external to the said body and supplying chlorine to the water as the operation proceeds.

8. An improved process for the manufacture of cellulose which comprises circulating water through a body of cellulose-containing material while maintaining the said body covered with water, the circulation being maintained in a closed cycle by means external to the said body, and supplying chlorine to the circulating water as the operation proceeds.

9. An improved process for the manufacture of cellulose which comprises subjecting cellulose-containing material to preliminary treatment with a dilute solution of caustic soda for a short period under moderate pressure at an elevated temperature and thereafter subjecting the material to treatment with water to which chlorine is supplied as the reaction proceeds.

10. The improvement in the treatment of flax straw for the production of cellulose fibre products which comprises digesting the straw with a dilute alkaline solution and thereafter subjecting it to treatment with water to which chlorine is supplied as the operation proceeds.

11. The improvement in the treatment of flax straw for the production of cellulose fibre products which comprises digesting the straw with a dilute alkaline solution and thereafter subjecting it to treatment with water to which chlorine is supplied as the operation proceeds while maintaining the temperature between about 45° and 75° F.

12. The improvement in the treatment of flax straw for the production of cellulose-fibre products which comprises digesting the straw with a dilute alkaline solution and thereafter subjecting it to treatment with water to which about 150 to 175 pounds of chlorine per ton of straw is supplied as the operation proceeds.

13. The improvement in the treatment of flax straw for the production of cellulose fibre products which comprises digesting the straw with a dilute alkaline solution and thereafter subjecting it to treatment with water to which about 150 to 175 pounds of chlorine per ton of straw is supplied at the rate of 30 to 35 pounds per hour per ton of straw.

14. The improvement in the treatment of flax straw for the production of cellulose fibre products which comprises digesting the straw with a dilute alkaline solution and thereafter subjecting it to treatment with water to which chlorine is supplied as the operation proceeds, the water being maintained in active circulation through the straw by means external to the straw being treated.

15. The improvement in the treatment of flax straw for the production of cellulose fibre products which comprises digesting the straw with a solution containing about 1% by weight of caustic soda on the weight of straw and thereafter subjecting it to treatment with water to which chlorine is supplied as the operation proceeds.

16. The improvement in the treatment of flax straw for the production of cellulose fibre products which comprises digesting the straw with a solution containing about 1% by weight of caustic soda on the weight of straw for about 3 to 4 hours and thereafter subjecting the straw to treatment with water to which about 150 to 175 pounds of chlorine per ton of straw is supplied at the rate of about 30 to 35 pounds per hour while maintaining the temperature between about 45° and 75° F.

17. The improvement in the treatment of flax straw for the production of cellulose fibre products which comprises subjecting the unpulped straw to treatment with water to which chlorine is supplied as the operation proceeds, the water being maintained in active circulation through the straw by means external to the straw being treated.

18. In the process of claim 10, the improvement which comprises carrying out the alkaline digestion in the absence of air.

In testimony whereof I affix my signature.

EDGAR RAYMOND CLARK.